United States Patent
Zweege et al.

(10) Patent No.: US 9,194,355 B2
(45) Date of Patent: Nov. 24, 2015

(54) METHOD AND DEVICE FOR MONITORING AN ATTACHMENT FOR SWITCHING A STARTER

(75) Inventors: Remco ten Zweege, Stuttgart (DE);
Gerald-Markus Mueller, Kornwestheim (DE); Uemit Cansever, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 909 days.

(21) Appl. No.: 13/388,815

(22) PCT Filed: Jul. 21, 2010

(86) PCT No.: PCT/EP2010/060578
§ 371 (c)(1),
(2), (4) Date: Apr. 11, 2012

(87) PCT Pub. No.: WO2011/015455
PCT Pub. Date: Feb. 10, 2011

(65) Prior Publication Data
US 2012/0197515 A1    Aug. 2, 2012

(30) Foreign Application Priority Data

Aug. 6, 2009 (DE) .......... 10 2009 028 290
Aug. 27, 2009 (DE) .......... 10 2009 028 955

(51) Int. Cl.
| F02N 11/08 | (2006.01) |
| F02N 11/10 | (2006.01) |
| F02D 41/22 | (2006.01) |
| F02D 41/20 | (2006.01) |

(52) U.S. Cl.
CPC .......... *F02N 11/0825* (2013.01); *F02N 11/087* (2013.01); *F02N 11/108* (2013.01); *F02D 41/22* (2013.01); *F02D 2041/2089* (2013.01); *F02D 2041/2093* (2013.01); *Y02T 10/48* (2013.01)

(58) Field of Classification Search
CPC . F02N 11/0825; F02N 11/108; F02N 11/087; F02N 41/22; F02N 2041/2093; F02N 2041/2089; Y02T 10/48
USPC .......... 123/179.4, 179.3; 701/107, 113, 29.1, 701/29.2
See application file for complete search history.

(56) References Cited

U.S. PATENT DOCUMENTS 3,676,761 A * 7/1972 Fortune .......... 318/574
3,677,308 A * 7/1972 Sarff et al. .......... 140/93.6
(Continued)

FOREIGN PATENT DOCUMENTS

| CN | 1821569 | 8/2006 |
| DE | 40 05 609 | 8/1991 |

(Continued)

OTHER PUBLICATIONS

International Search Report for PCT/EP2010/060578, dated Oct. 13, 2010.

*Primary Examiner* — Hieu T Vo
*Assistant Examiner* — Sherman Manley
(74) *Attorney, Agent, or Firm* — Kenyon & Kenyon LLP

(57) ABSTRACT

In a method for monitoring an attachment for switching a starter of an internal combustion engine, at least one output stage for controlling the current flow with the aid of an actuator is monitored with regard to function. The output stage is checked for proper function prior to shutdown of the internal combustion engine.

3 Claims, 1 Drawing Sheet

(56) References Cited

U.S. PATENT DOCUMENTS

| | | | |
|---|---|---|---|
| 3,761,794 A * | 9/1973 | Quinlisk et al. | 318/472 |
| 5,602,691 A * | 2/1997 | Iwabuchi | 360/75 |
| 6,066,932 A * | 5/2000 | Fetzer | 318/445 |
| 6,973,911 B2 * | 12/2005 | Yamashita | 123/335 |
| 7,319,926 B2 * | 1/2008 | Suzuki | 701/29.1 |
| 7,760,850 B2 * | 7/2010 | Kasuya | 378/15 |
| 8,070,569 B2 * | 12/2011 | Palmer et al. | 454/184 |
| 8,369,060 B2 * | 2/2013 | Wodniok | 361/160 |
| 8,380,388 B2 * | 2/2013 | Shin et al. | 701/29.2 |
| 8,442,717 B2 * | 5/2013 | Kanemoto et al. | 701/33.6 |
| 8,498,772 B2 * | 7/2013 | Kanemoto et al. | 701/29.1 |
| 8,731,765 B2 * | 5/2014 | Wang et al. | 701/29.2 |
| 8,818,611 B2 * | 8/2014 | Shin et al. | 701/29.1 |
| 2008/0127927 A1 * | 6/2008 | Hirning et al. | 123/179.3 |
| 2009/0241884 A1 * | 10/2009 | Saitoh et al. | 123/179.4 |
| 2009/0309530 A1 * | 12/2009 | Shin | 318/490 |

FOREIGN PATENT DOCUMENTS

| | | |
|---|---|---|
| DE | 102 31 088 | 1/2004 |
| DE | 10 2007 009 527 | 9/2007 |
| EP | 2 055 916 | 5/2009 |
| JP | 10-196501 | 7/1998 |
| JP | 2002-115634 | 4/2002 |

* cited by examiner

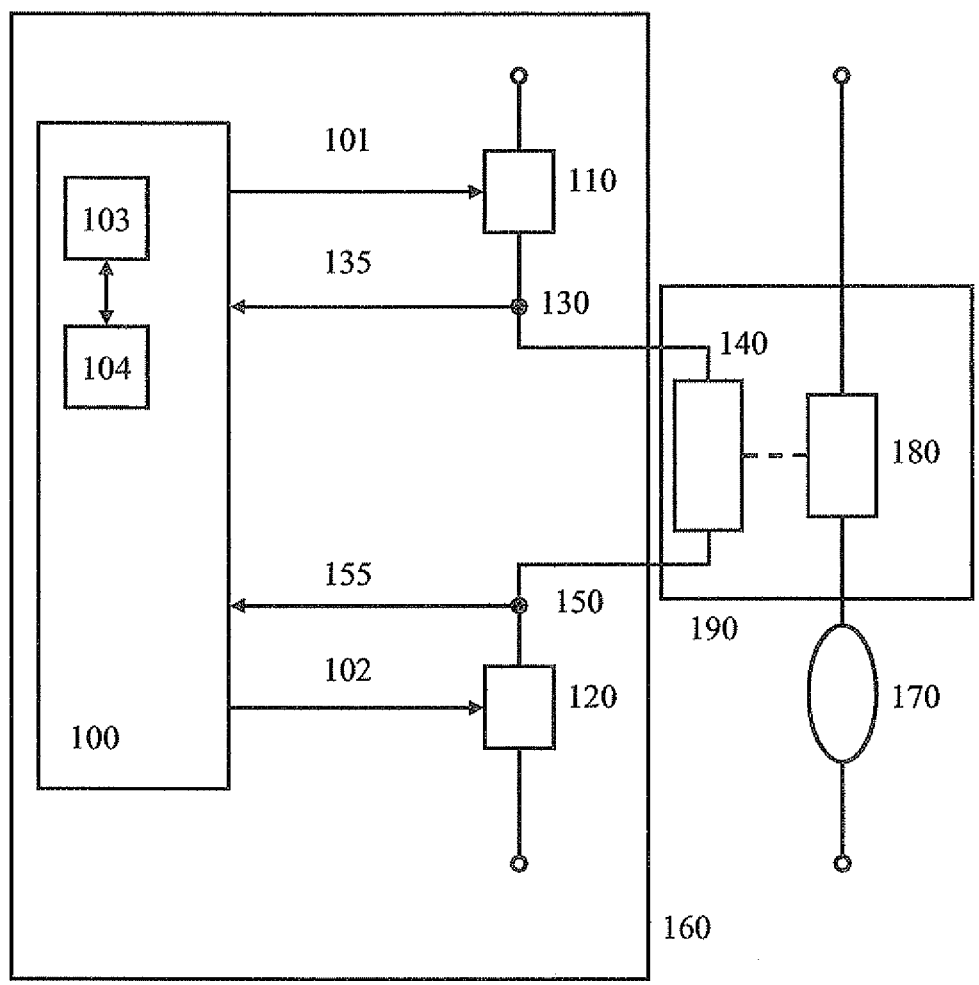

METHOD AND DEVICE FOR MONITORING AN ATTACHMENT FOR SWITCHING A STARTER

BACKGROUND OF THE INVENTION

1. Field of the Invention

The present invention is directed to a method and a device for monitoring an attachment for switching a starter.

2. Description of Related Art

An actuator for the starting system of an internal combustion engine of a motor vehicle is known from published German patent application document DE 102 31 088 A1. The attachment describes an actuator for cranking a starter motor, in particular for a starting system of an internal combustion engine of a motor vehicle which cranks the starter motor upon request of a control unit. For example, the attachment includes at least one transistor as the output stage as well as means for checking the reliability of the transistor.

Furthermore, a method and a device for monitoring the reliability of an electrical consumer is known from published German patent application document DE 40 05 609 A1. With the aid of this method, faults of the consumer are detected by comparing the control signals of the consumer and a feedback signal. By logically evaluating the signals before, during and after a switching event, a short circuit to ground or to the supply voltage, as well as a cable drop, may be detected. In this case, a distinction may be made between the individual fault scenarios.

If a fault occurs in this attachment for switching a starter during the course of the operation, and if the starter is used in a vehicle having a start/stop operation, it may happen that the fault occurs shortly before stopping of the internal combustion engine. If the internal combustion engine is stopped, a restart of the internal combustion engine is no longer possible.

BRIEF SUMMARY OF THE INVENTION

The method according to the present invention and the device according to the present invention have the advantage over the related art that a reliable operation of the internal combustion engine is possible.

This procedure is particularly advantageous in vehicles which are equipped with an automatic start-stop function. The checking may reliably prevent the vehicle from being shut down in the event of a fault and no longer being able to be restarted. After a fault has been detected, the driver of the vehicle may continue operating the vehicle having a defective output stage and may drive to a repair shop under the vehicle's own power. If this checking for faults were not carried out, the internal combustion engine would be shut down during the start-stop operation and a restart would not be possible. In this case, the vehicle would break down.

It is particularly advantageous, if a start/stop coordinator transmits an intention to stop to a monitoring unit, that in the presence of an intention to stop the monitoring unit checks whether a line interruption is present and that the start/stop coordinator stops the internal combustion engine only when the monitoring unit does not report a fault. In the presence of an intention to stop, it is checked whether a fault, in particular a line interruption, is present, and the internal combustion engine is only stopped when it is detected that no fault is present, in particular no line interruption.

BRIEF DESCRIPTION OF THE DRAWINGS

FIG. 1 shows an exemplary embodiment of the present invention for monitoring an attachment for switching a starter.

DETAILED DESCRIPTION OF THE INVENTION

FIG. 1 shows one exemplary embodiment of the procedure according to the present invention. Reference numeral 100 designates a control unit. It controls a first output stage 110 via a first control line 101. Furthermore, control unit 100 controls a second output stage 120 via a second control line 102. Control unit 100 includes a start/stop coordinator 103 and a monitoring unit 104. They exchange signals between each other.

Output stage 110 is connected to a coil 140 via a first tie point 130. Coil 140, in turn, is in contact with second output stage 120 via a second tie point 150. First tie point 130 and second tie point 150 are connected to control unit 100 via feedback lines 135 and 155, respectively. Control unit 100 and the elements previously described, except for coil 140, are preferably integrated into an engine control unit 160.

A starter 170 is connected to a supply voltage Ubat via a contact 180. The second terminal of starter 170 is connected to a ground connection. Contact 180 and coil 140 together form an actuator. This actuator 190 is usually also referred to as a starter relay.

Voltage is applied to coil 140 via the first and the second output stages which may also be referred to as high side and low side output stages. Coil 140 of the control relay of the starter is located between the two output stages. If the output stages are controlled at the same time, a control current flows through this coil 140. The magnetic field generated by the coil closes contact 180 between battery voltage Ubat and starter 170.

A fault at the output stages may interfere with the relay or even make it impossible to control. For this reason, these output stages are monitored by control unit 100 via at least one feedback line. For this purpose, tie points 130 and 150 are connected to control unit 100.

A potential fault represents a short circuit to the battery voltage, i.e., coil 140 is directly connected to the battery voltage. This is relatively easily detectable by evaluating the first feedback line at tie point 130. This fault is detected if battery voltage Ubat is applied to tie points 130 and/or 150 during normal operation of the internal combustion engine, during which the output stages do not conduct. A short circuit to ground is accordingly detected if ground is applied to one or both tie points.

In the event of a line interruption, the connection between coil 140 and at least one of output stages 110, 120 is interrupted. If this fault occurs, the coil cannot be controlled and the starter can thus no longer be actuated. In order to detect a line interruption, it is necessary that at least one of the two output stages is energized. If this is the case, a line interruption is detected if different voltage values are applied to the two tie points 130 and 150 in the energized state.

By evaluating the voltages at tie points 130 and 150, various faults may be detected. With the aid of such a passive diagnosis, a short circuit to the battery or a short circuit to ground may be detected, for example. This is checked by monitoring unit 104.

A line interruption cannot be detected through passive fault observation since the corresponding voltage does not differ from the non-controlled state. In order to detect a line interruption, it is provided according to the present invention that at least one of the two output stages is actively controlled via a test pulse and the two feedback lines are observed. If the two signals at the tie points do not correspond with the expected values, monitoring unit 104 detects faults.

The figure shows an attachment having two output stages. The procedure according to the present invention is not limited to this application. It may be employed with systems having one output stage. First output stage 110 or second output stage 120 may be dispensed with, for example. Furthermore, it may be provided that the feedback signal is evaluated only at one tie point. Furthermore, it may also be provided that additional output stages are used.

Such starters are used in so-called start-stop systems. In such a start-stop system, it is provided that the internal combustion engine is shut down in certain states although the driver has not yet disabled the internal combustion engine via the ignition key. This happens in particular during a short-term standstill, e.g., at a red traffic light. If the driver intends to continue driving he/she signalizes that intention by actuating at least one operating element. This results in the starter being reactivated and the internal combustion engine being restarted. For this purpose, the start/stop coordinator is provided. It detects whether a state prevails during which the internal combustion engine may be shut down. If corresponding signals are present, it also induces the restart of the internal combustion engine.

If the internal combustion engine is shut down in this way in the presence of a defective output stage of the starter during the start-stop operation, a restart is no longer possible. This results in a breakdown of a vehicle with a defect. Such a breakdown of a vehicle is undesirable and should be avoided in any case.

It is therefore provided according to the present invention that the output stage is checked for reliability prior to shutdown of the internal combustion engine, and the stopping process is only initiated if no fault has been detected in the area of the output stage. If a fault is detected in the area of the output stage, no stopping process is carried out. Using this procedure, continuous operation of the internal combustion engine is possible even in the case of a defective output stage of the starter; i.e., stopping is prohibited if a fault is detected. This, in turn, results in this being accordingly taken into account for the control of the start-stop device. It is particularly advantageous if this is additionally displayed to the driver so that he/she is prompted to drive to the next repair shop without shutting down the vehicle.

According to one embodiment of the present invention, the following procedure is provided. If a start/stop coordinator defines a stop signal for the internal combustion engine, control unit 100 checks whether a fault is present. For this purpose, the feedback signals at tie points 130 and/or 150 are evaluated, for example. If no fault is detected, the stop signal is released and the internal combustion engine is shut down. In particular, a proper function is detected if no short circuit to the battery, no short circuit to ground and/or no line interruption are present.

If control unit 100 detects one or multiple of these faults, the stop signal is not released and the internal combustion engine is not shut down. In one advantageous embodiment it is further provided that a corresponding fault is signalized to the driver so that he/she may drive to the next repair shop.

In one particularly advantageous embodiment, a handshake between start/stop coordinator 103 and monitoring unit 104 is provided. For this purpose, it is proceeded as follows. If the start/stop coordinator detects a state in which the internal combustion engine should be stopped, start/stop coordinator 103 transmits an intention to stop to monitoring unit 104. In the presence of an intention to stop, the monitoring unit checks whether a line interruption is present. For this purpose, monitoring unit 104 applies a test signal to one of the output stages and evaluates the voltages at the tie points. If the voltage values at tie points 130 and 150 deviate from one another, monitoring unit 104 detects a line interruption. Here, it is advantageous that an evaluation with regard to faults may be carried out during the test control of one output stage but without current flowing through coil 140.

In one embodiment, it may also be provided that both output stages are controlled during the test control. In this case, the test control is so short that faults may be detected; the starter, however, does not yet respond. The test control is preferably so short that relay 190 does not yet respond.

If the monitoring unit detects a line interruption, monitoring unit 104 reports this back to the start/stop coordinator. The start/stop coordinator does not induce a stop of the internal combustion engine.

If monitoring unit 104, however, detects that no line interruption is present, it also reports this back to the start/stop coordinator. The start/stop coordinator then releases the shutdown of the internal combustion engine. The start/stop coordinator stops the internal combustion engine only when the monitoring unit reports that no fault is present.

In the presence of an intention to stop, monitoring unit 104 carries out a diagnosis with regard to line interruption. The start/stop coordinator waits until the diagnosis is carried out and the result is present. Only when the result is present that no line interruption has been detected does the start/stop coordinator stop the internal combustion engine.

What is claimed is:

1. A method for monitoring an attachment for switching a starter of an internal combustion engine, comprising:
    monitoring, by a monitoring unit including a processor, functioning of at least one output stage of at least two output stages for controlling the current flow with the aid of an actuator having a coil, wherein the coil is connected between the at least two output stages via two tie points, wherein the monitoring includes checking during a start-stop operation of the internal combustion engine prior to shutdown of the internal combustion engine whether a line interruption is present when an intention to stop the internal combustion engine is indicated by a start/stop coordinator, wherein the checking of whether a line interruption is present includes (i) applying a test signal to one of the at least two output stages, (ii) evaluating the voltage values at the two tie points, and (iii) determining a line interruption is present if the voltage values at the two tie points deviate from one another; and
    stopping, by the start/stop coordinator, the internal combustion engine when no line interruption is present.

2. The method as recited in claim 1, wherein proper functioning of the at least one output stage is detected if no line interruption is present.

3. A device for monitoring an attachment for switching a starter of an internal combustion engine, comprising:
    a start/stop coordinator; and
    a monitoring unit for monitoring functioning of at least one output stage of at least two output stages for controlling the current flow with the aid of an actuator having a coil, wherein the coil is connected between the at least two output stages via two tie points, wherein the monitoring unit checks during a start-stop operation of the internal combustion engine prior to shutdown of the internal combustion engine whether a line interruption is present when an intention to stop the internal combustion engine is indicated by a start/stop coordinator, wherein the checking of whether a line interruption is present includes (i) applying a test signal to one of the at least two output stages, (ii) evaluating the voltage values at the two tie points, and (iii) determining a line interruption is present if the voltage values at the two tie points deviate from one another, and wherein the start/stop coordinator stops the internal combustion engine when the monitoring unit does not detect a line interruption.

* * * * *